INVENTORS
GUNTHER HEINRICH WILHELM DOBBERTIN
AND BENGT OLOF JOHAN STELLAN MÖRNER
BY *Linton and Linton*
ATTORNEYS Dec. 21, 1965  G. H. W. DOBBERTIN ETAL  3,224,473
PORTABLE ENGINE-DRIVEN CHAIN SAWS
Filed Nov. 26, 1962  4 Sheets-Sheet 3

INVENTORS
GUNTHER HEINRICH WILHELM DOBBERTIN
AND BENGT OLOF STELLAN MÖRNER

BY Linton and Linton
ATTORNEYS

United States Patent Office 3,224,473
Patented Dec. 21, 1965

3,224,473
PORTABLE ENGINE-DRIVEN CHAIN SAWS
Gunther Heinrich Wilhelm Dobbertin, 28 Ovra Olskroksgatan, and Bengt Olof Johan Stellan Mörner, 6A Olbersgatan, both of Gothenburg, Sweden
Filed Nov. 26, 1962, Ser. No. 240,117
Claims priority, application Sweden, Apr. 3, 1962, 3,686/62
3 Claims. (Cl. 143—32)

The present invention relates to portable engine-driven chain saws of the kind wherein the engine is mounted in a casing provided with carrying handles and provided also with a mounting member for the saw bar.

Previously known power-driven saws of this kind have had the drawback that the comparatively powerful vibrations from the engine have been transmitted via the casing directly to the carrying handles of the saw. Attempts have been made to overcome this by mounting the carrying handles resiliently to the casing, but due to the elastic coupling between the handles and the saw this measure instead has brought with it the inconvenience that the operator has not been able to guide the saw with the precision desired.

The present invention, which has for its primary object to overcome the inconvenience mentioned above, is mainly characterised in that the engine and the saw bar are rigidly interconnected and mounted in the casing by the intermediary of resilient means.

A preferred embodiment of the invention is characterised in that the resilient means for mounting the engine in the casing comprises two annular pieces of soft rubber or the like placed each on one side of the crankcase of the engine coaxially with the crankshaft of the engine, and in that strips of soft rubber or the like are placed between oppositely disposed edges of the saw bar mounting member and edge portions of the casing coextending therewith, said edges extending substantially in parallel with the length of the saw bar.

The strips placed between the saw bar mounting member and the casing may have, according to the invention, a substantially T-shaped cross-section, and there may be provided two pairs of angle irons with each pair thereof having one pair of flanges attached to the saw bar mounting member, and the other flanges thereof embracing the stem of the T, with said edge portions of the casing being inserted into the strips between said other pair of flanges.

The invention will be more fully described herebelow, reference being had to the accompanying drawings wherein.

Figure 1:
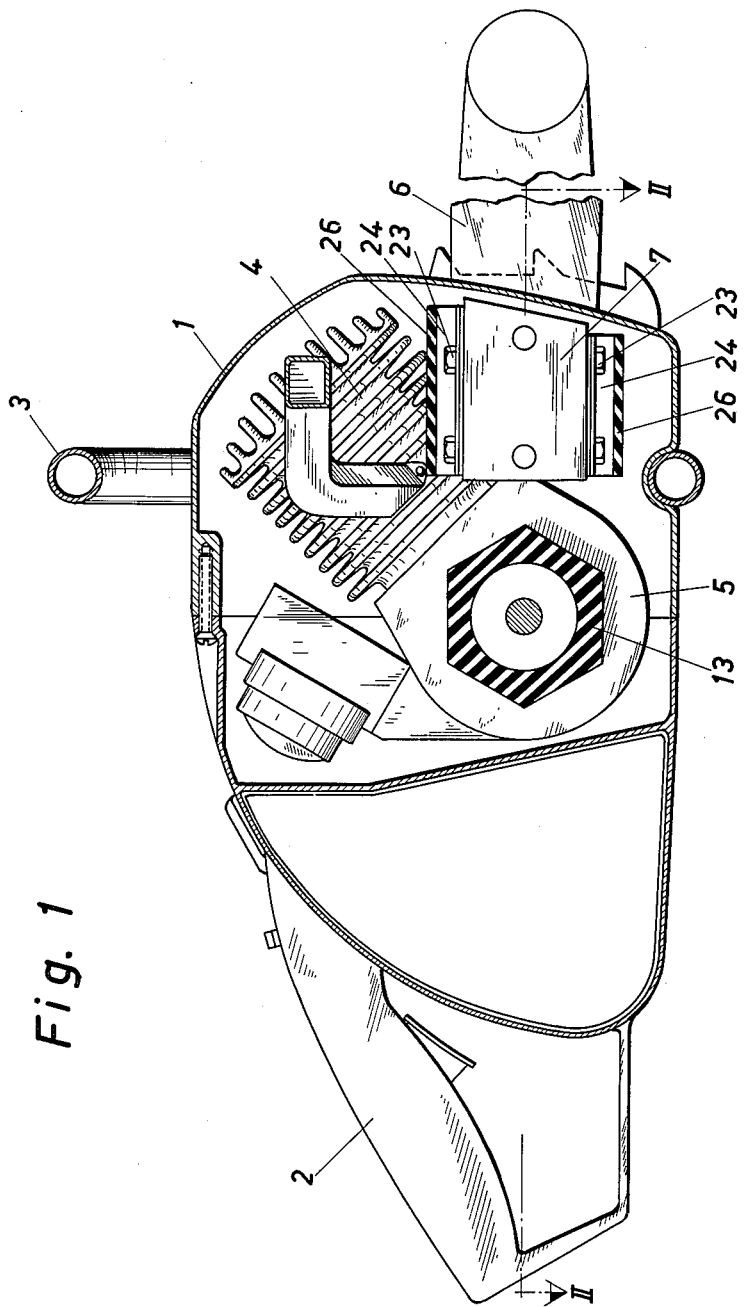
FIG. 1 is a longitudinal section through a power-driven saw according to the invention.

In the drawings, numeral 1 indicates the casing of the power-driven saw, said casing being provided with a handle 2 and a carrying yoke 3 and enclosing an internal combustion engine, the cylinder and crank case of which are indicated in the drawings at 4 and 5, respectively, and which is adapted to drive a saw chain (not shown in the drawings) which runs around a saw bar 6 extending from the casing and having its inner end secured to a saw bar mounting member 7 arranged in the casing. The saw bar mounting member is rigidly connected with the crank case 5. In the embodiment shown the saw bar mounting member and one half of the crank case are cast together in one piece, said mounting member 8 being connected with said crank case half by means of a web portion indicated at 8 in FIG. 2.

The crank case is provided at two opposite sides with journal housings 9 coaxial with one another for the crank shaft 10 which extends through the crank case. Around the end portion of each housing 9 there is provided a sleeve 11 which has an annular flange 12 bent inwardly at right angles and abutting against the end surface of the housing 9. Around each of the sleeves 11 there is provided an annulus 13 of soft rubber or similar resilient material which is secured to the sleeve and which is provided at its outer periphery, which is hexagonal in the embodiment shown, with a sleeve 14 with corresponding shape which surrounds the annulus 13 and which has an outwardly directed radial flange 15 engaging in a slot in the thickened edge portion of an opening provided in a wall 16 or 17, respectively, of the casing.

Figure 2:
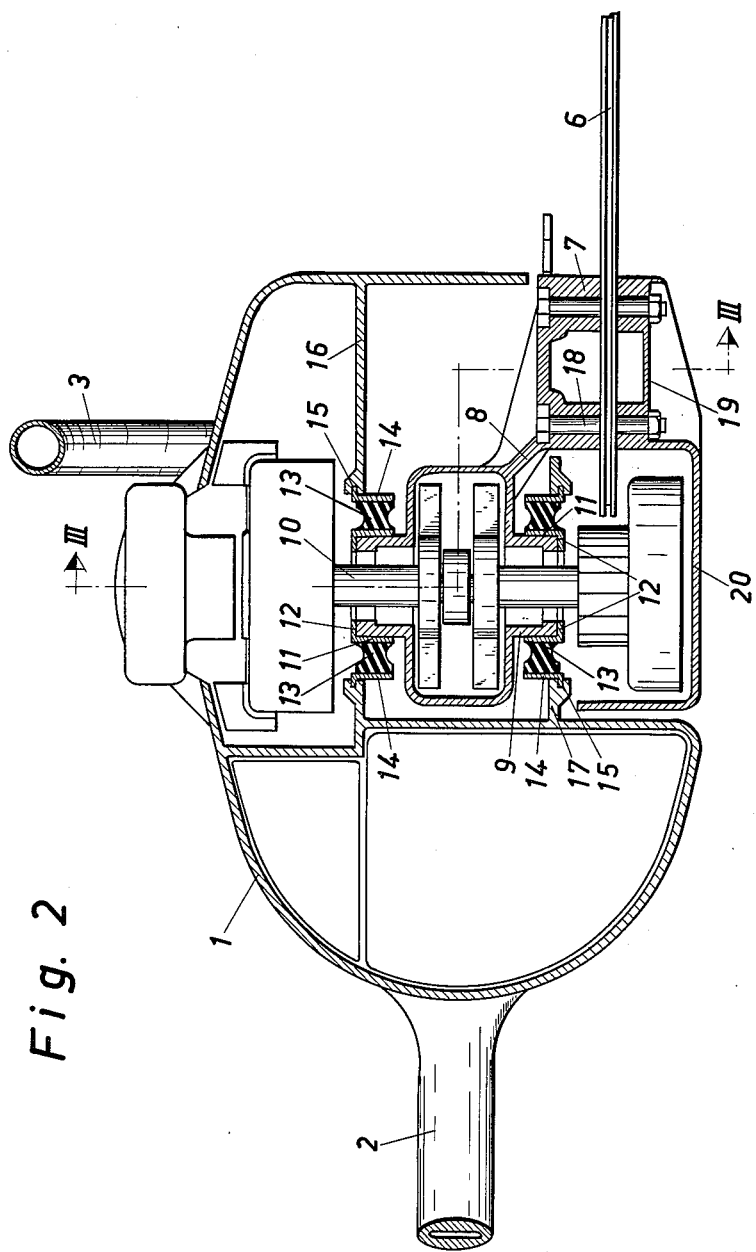
FIG. 2 is a cross-section through the saw taken on the line II—II in FIGURE 1.
Figure 3:
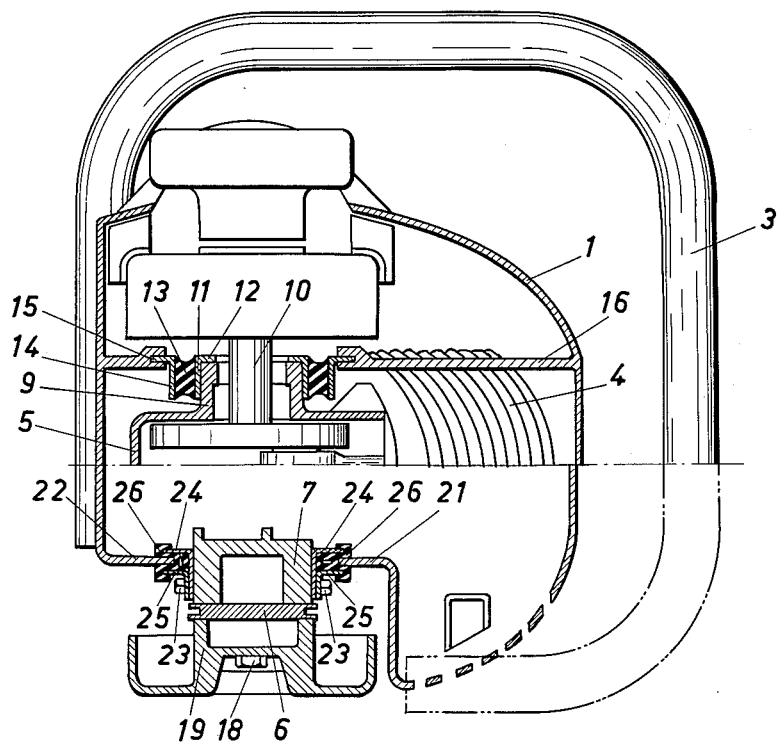
FIG. 3 is a cross-section substantially along the line III—III in FIGURE 2.
Figure 4:
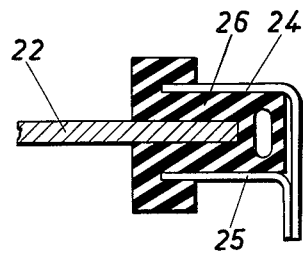
FIG. 4 is a cross-section to a larger scale through an arrangement for mounting the saw bar mounting member to the casing of the saw.

As will appear from FIGS. 2 and 3 the saw bar 6 is attached to the saw bar mounting member 7 by means of bolts 18 which extend through the saw bar mounting member and the saw bar and through a plate 19 which is provided at the outer side of the saw bar and which is made in one piece with a cover plate 20 for the drive means for the saw chain (FIG. 2). The saw bar mounting member 7 projects into an opening between two edge portions 21 and 22 of wall portions forming part of the casing (see FIG. 3). At each of those oppositely disposed sides of the saw bar mounting member which extend substantially in parallel with said edge portions and with the length of the saw bar, there are provided two angle irons 24 and 25 secured by means of screws 23. The flanges of the angle irons which project at right angles to said side surfaces of the saw bar mounting member and which are parallel with one another and spaced from one another, embrace a strip 26 made from soft rubber or similar resilient material, in the manner illustrated more closely in FIGURE 4. The strip 26 has a substantially T-shaped cross-section, and the projecting flanges of the angle irons 24 and 25 embrace the stem of the T and have their edge portions projecting into the head portion of the T-strip 26. The strip 26 further is provided with a slot open towards that side of the head portion which is opposite to the stem portion for receiving the wall edge portion 21 and 22, respectively.

Figure 5:
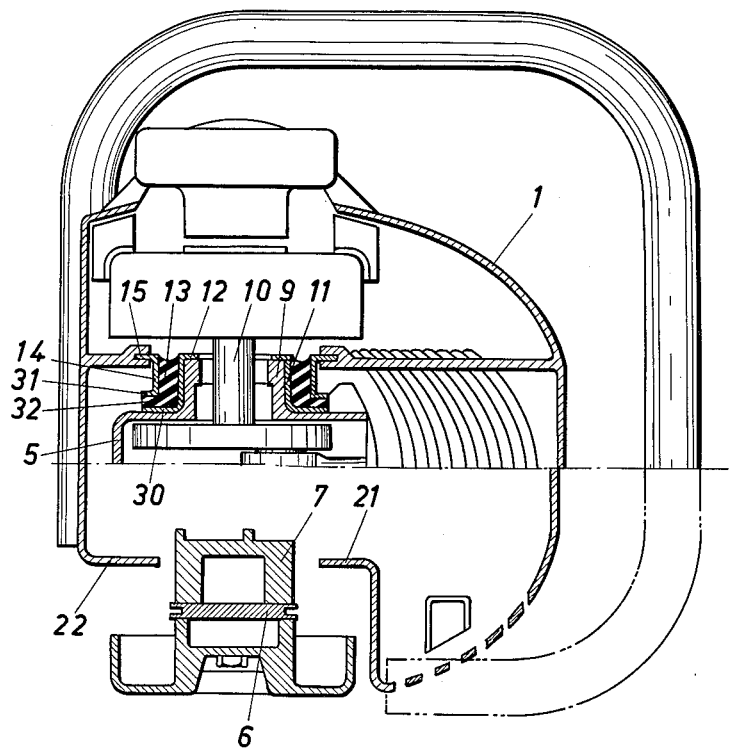
FIG. 5 is a cross-section corresponding to FIGURE 3 through a saw according to a modified embodiment of the invention.

By means of the arrangements described above a considerable damping of the engine vibrations is obtained, so that a considerable portion of the vibrations are prevented from being transmitted to the casing, and at the same time the handling of the saw during sawing is in no way impaired. In the embodiment which has been described above, the resilient means between the engine crank case and the saw casing consists of the aforesaid annuli 13 but it is obvious that these could be replaced by blocks of soft rubber or the like distributed around each journal housing 9. Also other embodiments are of course conceivable in respect of the rings 13 as well as in respect of the strips 26. In FIGURE 5 which is a cross-section corresponding to FIGURE 3 there is shown a somewhat modified embodiment wherein the resilient elements for the saw bar mounting member have been omitted. In order that the resilient elements of the crank case (only one such element is shown in FIGURE 5) may withstand the increased stresses thereon caused by omitting the resilient elements of the saw bar mounting member, the sleeves 11 and 14 are each provided, at their ends opposite to the flanges 12 and 15, respectively, with an outwardly turned flange 30 and 31, respectively, said flanges being spaced from one another so as to embrace an outwardly directed flange portion 32 of the rubber ring 13. Also in other respects the invention is not limited to the embodiment which has been described hereinbefore with reference to FIGURES 1–4, said embodiment being susceptible of various modifications with respect to its details without departing from the spirit of the invention.

What we claim is:

1. A portable chain saw comprising a saw bar, an engine having a crankshaft, a saw bar mounting member rigidly connected with said engine, means rigidly securing said saw bar to said mounting member, a casing, carrying handles rigidly connected to said casing, a pair of rings of resilient material, means connecting said rings at their inner peripheries to said engine coaxially with the crankshaft of said engine, and means connecting said rings at their outer peripheries to said casing.

2. A portable chain saw comprising a saw bar, an engine, a saw bar mounting member rigidly connected to said engine, means rigidly securing said saw bar to said mounting member, a casing, carrying handles rigidly connected to said casing, said mounting member having two opposite sides parallel with and at right angles to the plane of said saw bar, said casing having portions extending along and spaced from said mounting member sides, strips of resilient material being provided between said sides and said casing portions, and means resiliently mounting said engine in said casing.

3. A portable chain saw as claimed in claim 2 wherein said means resiliently mounting said engine consists of a pair of resilient rings each mounted on an opposite side of the crankcase of said engine coaxial with the crankshaft of the engine and means connects said resilient rings to said casing resiliently supporting said engine in said casing and each of said strips of resilient material has a substantially T-shaped cross-sectional configuration and a longitudinal recess, two pairs of angle arms each have one pair of flanges thereof attached to said saw bar mounting member and their other pair of flanges embracing the stem of one of said T-shaped strips and edge portions of said casing are each inserted into one of said strip recesses between said other pair of flanges of one of said pair of angle arms.

References Cited by the Examiner
UNITED STATES PATENTS

| | | |
|---|---|---|
| 2,357,230 | 8/1944 | Shade. |
| 2,534,738 | 12/1950 | Scott _____ 308—26 X |
| 2,645,254 | 7/1953 | Van Ausdall. |
| 2,894,489 | 7/1959 | Clay _____ 173—162 |
| 3,036,566 | 5/1962 | Dobbertin _____ 173—171 |
| 3,140,746 | 7/1964 | La Force _____ 173—162 |

FOREIGN PATENTS

| | | |
|---|---|---|
| 574,252 | 4/1959 | Canada. |

WILLIAM W. DYER, JR., *Primary Examiner.*

DONALD R. SCHRAN, *Examiner.*